United States Patent [19]

Iwai

[11] Patent Number: 5,784,371
[45] Date of Patent: Jul. 21, 1998

[54] ATM ELECTRONIC EXCHANGE NETWORK SYSTEM AND ELECTRODE EXCHANGE EQUIPMENT FOR USE IN THE SAME

[75] Inventor: Kazuhiro Iwai, Tokyo, Japan

[73] Assignee: NEC Corporation, Tokyo, Japan

[21] Appl. No.: 584,224

[22] Filed: Jan. 11, 1996

[30] Foreign Application Priority Data

Jan. 13, 1995 [JP] Japan ................................. 7-003922

[51] Int. Cl.⁶ .................................................. H04L 12/56
[52] U.S. Cl. ........................ 370/397; 370/356; 370/466
[58] Field of Search ............................ 370/352, 353, 370/354, 356, 397, 399, 466, 474; 379/225, 219

[56] References Cited

U.S. PATENT DOCUMENTS

| | | | |
|---|---|---|---|
| 5,204,857 | 4/1993 | Obara | 370/354 |
| 5,301,189 | 4/1994 | Schmidt et al. | 370/356 |
| 5,457,684 | 10/1995 | Bharucha et al. | 370/352 |
| 5,483,527 | 1/1996 | Doshi et al. | 370/399 |
| 5,633,861 | 5/1997 | Hanson et al. | 370/232 |

FOREIGN PATENT DOCUMENTS 5-56490   3/1993   Japan.

*Primary Examiner*—Hassan Kizou
*Attorney, Agent, or Firm*—Foley & Lardner

[57] ABSTRACT

In an asynchronous transfer mode (ATM) electronic exchange network system interconnecting a plurality of electronic exchange equipment by an ATM network 40, each of the electronic exchange equipment has an ATM cell assembly/disassembly (CLAD) circuit 11, 21. CPU 14 in the electronic exchange equipment of a node 10 confirms a destination node 20 from a called number, indicates to CLAD circuit 11 a virtual path identifier (VPI) and a virtual channel identifier (VCI) which indicate the destination node 20 and which are read from a table in memory 12 representing the correspondence of nodes and identifiers of VPI and VCI, then ATM CLAD circuit 11 assembles information indicative of the VPI and VCI and user information including number and communication information transmitted through a time-division switch 13 into an ATM cell, and transfers the ATM cell to ATM network 40, and when ATM CLAD circuit 21 of node 20 receives a cell having in its cell header the pair of VPI and VCI which represents its own node 20, ATM CLAD circuit 21 disassembles the cell into a TDM signal, and transfers the TDM signal to the time-division switch 23.

8 Claims, 3 Drawing Sheets

5,784,371

1

ATM ELECTRONIC EXCHANGE NETWORK SYSTEM AND ELECTRODE EXCHANGE EQUIPMENT FOR USE IN THE SAME

BACKGROUND OF THE INVENTION

1. Field of the Invention

The present invention relates to an ATM (asynchronous transfer mode) electronic exchange network system and an electronic exchange equipment for use in such an ATM electronic exchange network system.

2. Description of the Prior Art

For constructing a private network which interconnects electronic exchange equipment through dedicated transmission lines, it has been customary to arrange multiplex transmission equipment of STM (synchronous transfer mode) for interfacing with the electronic exchange equipment, and high-speed digital transmission lines between the STM multiplex transmission equipment are utilized.

However, it has been proposed to construct a network between electronic exchange equipment through an ATM (asynchronous transfer mode) network by using ATM multiplex transmission equipment (ATM MUX equipment) which is capable of assembling and disassembling ATM cells and terminating the ATM network.

For example, Japanese laid-open patent publication No. 93-56490 discloses a system for controlling congestion between a PBX (private branch exchange) and ATM MUX equipment. The publication reveals that when congestion is detected between ATM MUX equipment, blocking is indicated to the PBX by a signal indicative of the status of the digital interface, thereby inhibiting calls from the PBX.

FIG. 1 of the accompanying drawings shows an electronic exchange network system in which a plurality of ATM MUX equipment capable of assembling and disassembling ATM cells are interconnected by an ATM network.

As shown in FIG. 1, EPABXs (electronic PABXs) 100, 200, 300 are connected to ATM network 400 through respective ATM MUX equipment 101, 201, 301 which have CLAD (cell assembly/disassembly) circuits 102, 103, 202, 203 302, 303 for assembling and disassembling ATM cells. A call signal sent from a telephone device 106 connected to EPABX 100 toward a telephone device connected to EPABX 200 is assembled to an ATM cell signal by CLAD circuit 103.

FIG. 2 of the accompanying drawings shows the format of the ATM cell signal. As shown in FIG. 2, a cell has a cell header which includes a VPI field which stores a VPI (virtual path identifier) and a VCI field which stores a VCI (virtual channel identifier). A cell is transferred to a certain destination ATM node which is determined by the values of the VPI and the VCI. Each of the CLAD circuits stores pairs of values of VPIs and VCIs which are indicative of predetermined destination ATM nodes. In CLAD circuit 103 of ATM MUX equipment 101, a call signal from EPABX 100 is assembled to a cell having a pair of particular values of VPI and VCI which indicate EPABX 200 as a destination ATM node. The cell is transmitted to EPABX 200 through ATM network 400, and then disassembled by CLAD circuit 202 of ATM MUX equipment 201. The call signal is transmitted through trunk circuit 204 to a telephone equipment connected to EPABX 200.

In the above conventional system, the EPABXs and the ATM MUX equipment are interconnected by conventional TDM digital interfaces. Since different transmission paths

2

(physical circuit lines or TDM channels) must be fixedly established with respect to respective routes to the parties to be connected, i.e., respective destinations, it is necessary to make available a maximum number of transmission paths for respective destinations between the EPABXs and the ATM MUX equipment. Consequently, the ATM MUX equipment needs to have CLAD circuits specified for respective destinations. And, since each of the CLAD circuits assembles cells at all times, a traffic of ATM cells which include no user information is produced even when no call is present.

SUMMARY OF THE INVENTION

It is an object of the present invention to provide an ATM electronic exchange network system and an electronic exchange apparatus for use in such an ATM electronic exchange network system in which CLAD circuits are not specified for particular destinations and which produces no traffic of cells which include no user information.

In accordance with the invention there is provided an ATM electronic exchange network system comprising:

a plurality of electronic exchange equipment each having ATM cell assembly/disassembly means for assembling and dissembling ATM cells; and an ATM network interconnecting the electronic exchange equipment.

The asynchronous transfer mode network may provide a permanent virtual circuit service (PVC service) in which a destination node is specified in advance fixedly by a virtual path identifier and a virtual channel identifier.

There is further provided an electronic exchange device for use in ATM electronic exchange network system interconnecting a plurality of electronic exchange devices by way of an ATM network in which a destination node is specified by a virtual path identifier and a virtual channel identifier, the electronic exchange equipment comprising:

a time-division switch;

cell assembly/disassembly means for assembling and disassembling ATM cells each having a virtual path identifier and a virtual channel identifier; and a CPU for recognizing a destination node based on a called number transmitted from a terminal equipment connected to the electronic exchange equipment, for indicating to the cell assembly/disassembly means a virtual path identifier and a virtual channel identifier corresponding to the destination node which are determined according to a procedure established between the electronic exchange equipment and the asynchronous transfer mode network, and for controlling operation of the electronic exchange equipment;

the cell assembly/disassembly means for assembling a TDM signal arriving from the time-division switch into a cell signal based on the virtual path identifier and virtual channel identifier which are indicated from the CPU, for sending the cell signal to the ATM network, disassembling the cell signal arriving from the ATM network into a TDM signal, and for sending the TDM signal to the time-division switch.

A virtual path identifier and a virtual channel identifier corresponding to the destination node may be read from a table which is previouly stored in memory means in the electronic exchange equipment and indicated to the cell assembly/disassembly means by the CPU.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

Figure 1:
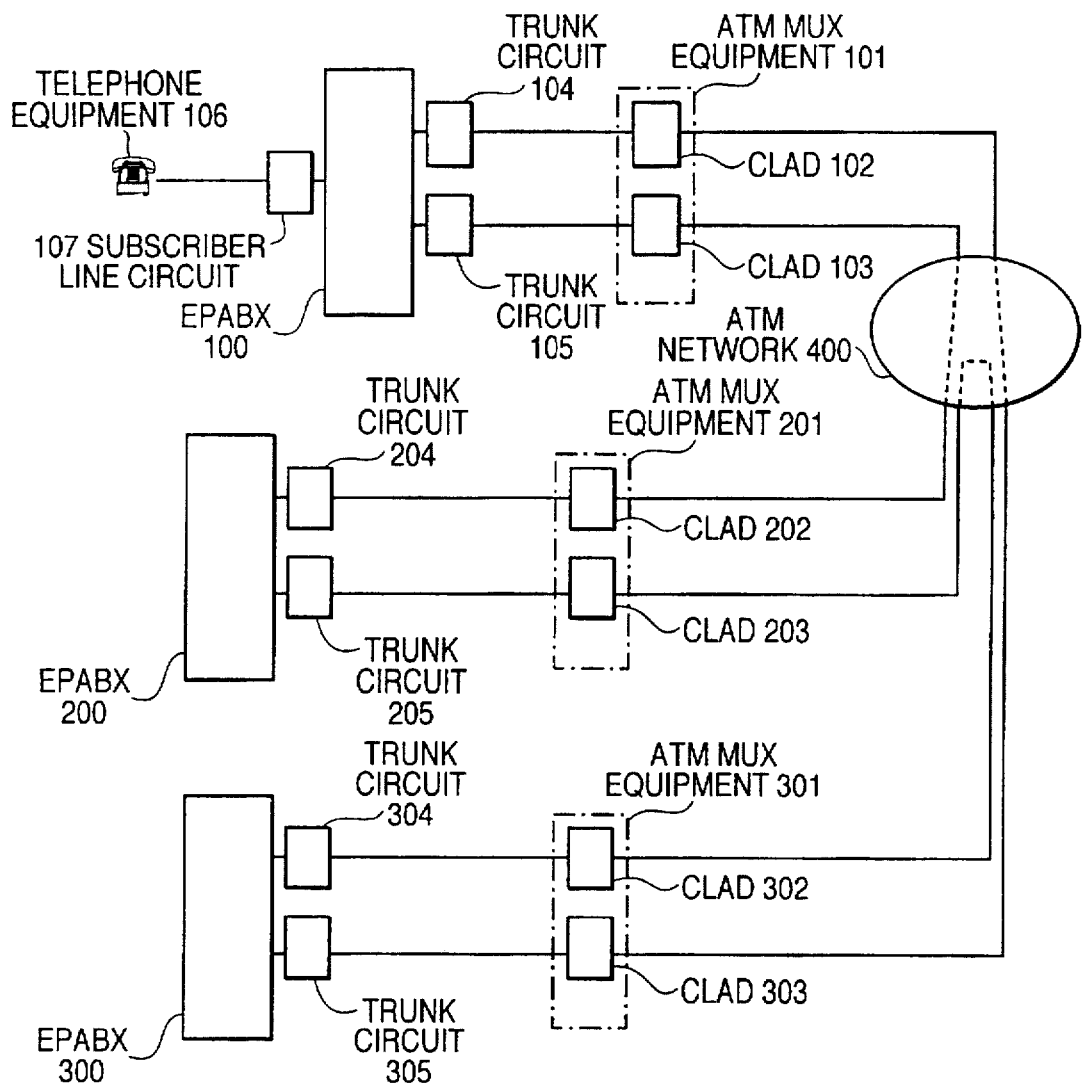
FIG. 1 is a block diagram showing a conventional electronic exchange network system which interconnects a plurality of EPABXs via an ATM network.
Figure 2:
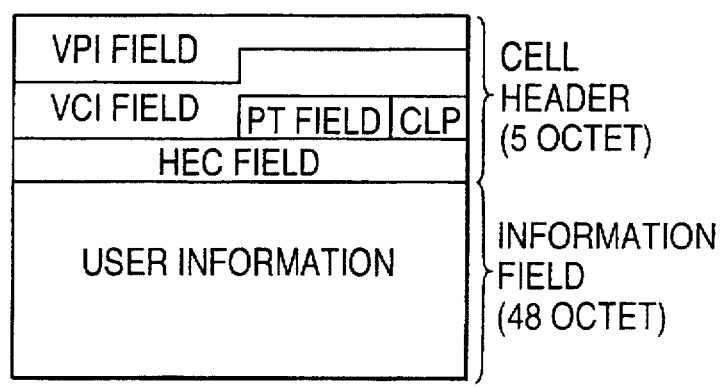
FIG. 2 shows a format of an ATM cell signal.
Figure 3:
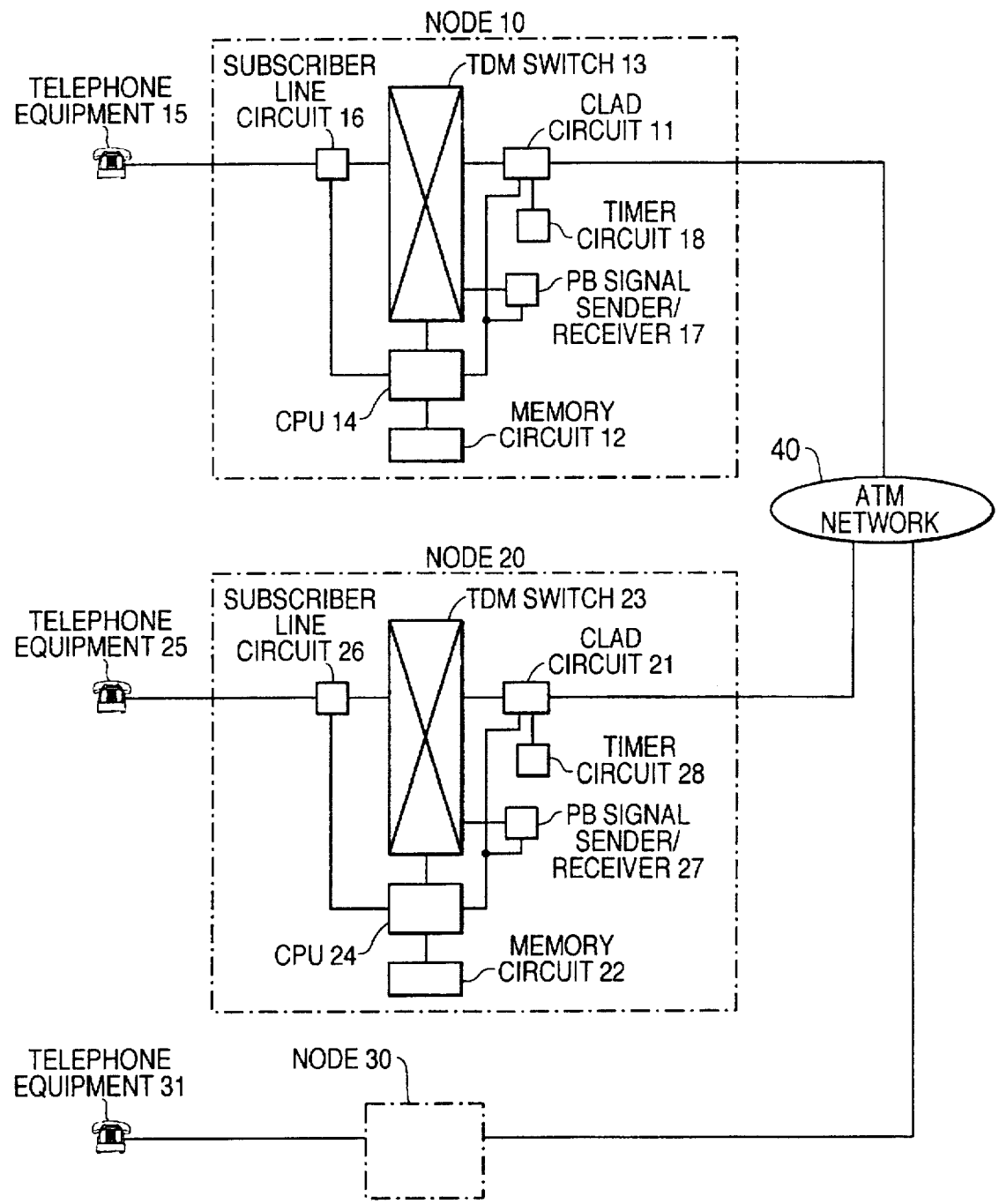
FIG. 3 is a block diagram showing an embodiment of an ATM electronic exchange network system according to the present invention.

As shown in FIG. 3, an ATM electronic exchange network system according to the present invention includes a plurality of nodes 10, 20, and 30. Each of nodes 10, 20, 30 comprises an EPABX, interconnected by an ATM network 40 which provides a Permanent Virtual Circuit (PVC) service, in which two identifiers, i.e., a pair VPI and VCI, which correspond to a destination node, are fixedly established in advance between the nodes. When a cell in which the information of the VPI field (see FIG. 2) represents VPI-1 and the information of the VCI field represents VCI-1 is transferred from node 10, the cell is then transferred to node 20. When a cell in which the information of the VPI field represents VPI-2 and the information of the VCI field represents VCI-2 is transferred from the node 10, the cell is then transferred to node 30 The EPABXs of respective nodes 10, 20 have respective time-division switches (TDM switches) 13, 23, respective memories 12, 22 for storing VPI and VCI information which identifies a destination node, respective CLAD circuits 11, 21 for establishing VPI and VCI information indicated by CPUs 14, 24 in respective VPI and VCI fields of cell headers, establishing TDM signals arriving from time-division switches 13, 23 in respective information fields, assembling the cell headers and information fields to cell signals, transmitting the cell signals to the ATM network 40, disassembling the cell signals transferred from the ATM network 40 into TDM signals, and transmitting the TDM signals to the TDM switches 13, 23, respective timer circuits 18, 28 for monitoring arrivals of cell signals, respective PB signal sender/receivers 17, 27, respective subscriber line circuits 16, 26, and respective CPUs (central processing units) 14, 24 for controlling operation of the various components of the EPABXs. Telephone devices 15, 25 are connected through respective subscriber line circuits 16, 26 to respective TDM switches 13, 23. Telephone devices 31 is connected to node 30.

Figure 4:
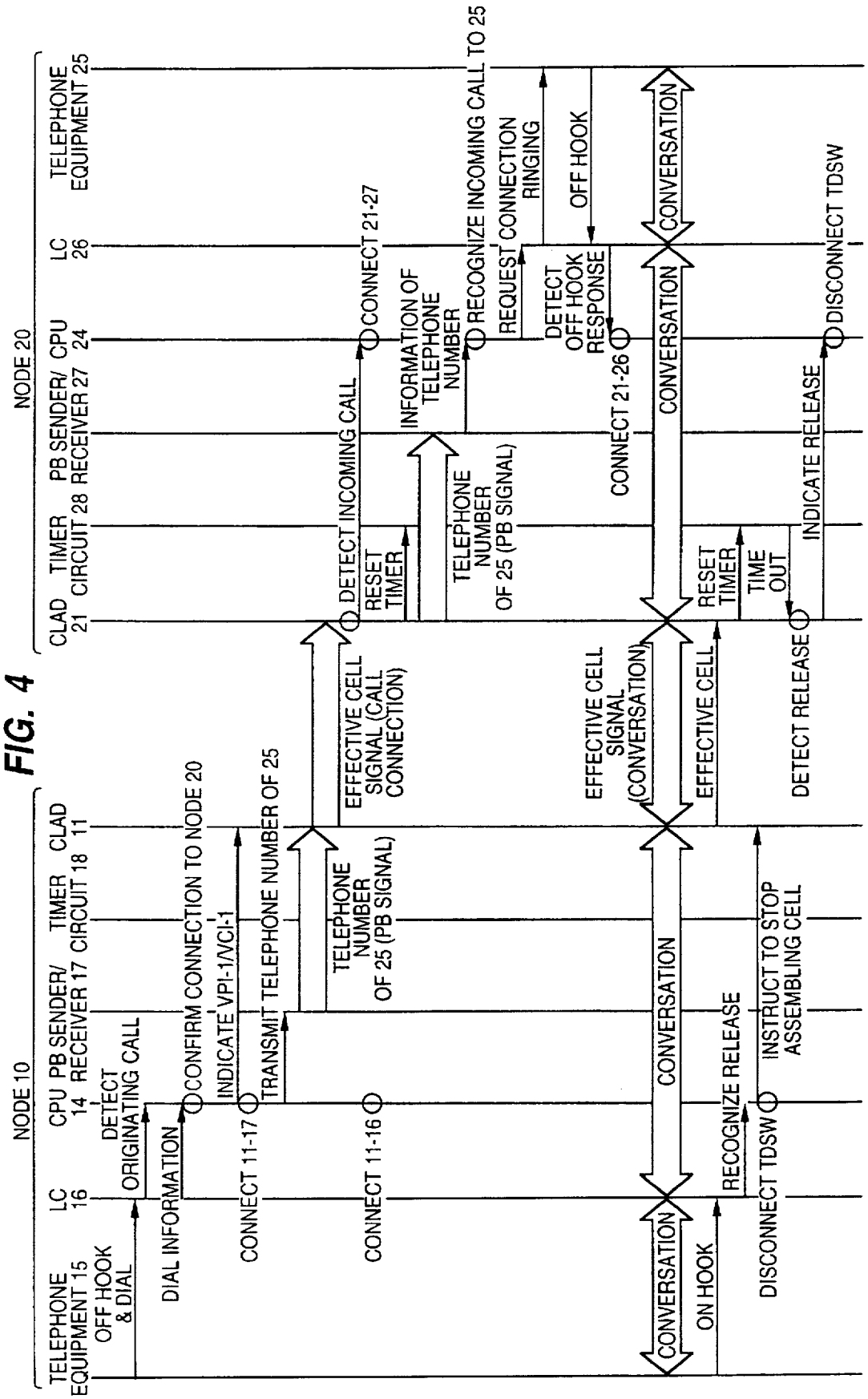
FIG. 4 is an arrow diagram showing operation of the ATM electronic exchange network system illustrated in FIG. 3.

A process of establishing a connection from telephone device 15 of node 10 to telephone device 25 of node 20 will be described below with reference to FIG. 4.

Here, a table representing the correspondence of nodes and identifiers of VPI and VCI is stored in memories 12, 22 of nodes 10, 20.

After off-hook, the user of telephone device 15 dials a node connecting number for connection to node 20 and a directory number of telephone device 25 of node 20. CPU 14 detects the originating call through subscriber line circuit (LC) 16, receives called number from telephone equipment 15, and confirms that the call is a request for connection to node 20. The CPU 14 then reads VPI-1 and VCI-1 which represent VPI and VCI information corresponding to the node 20 from memory 12, and indicates VPI-1 VCI-1 to CLAD circuit 11. CPU 14 also controls the TDM switch 13 to connect PB signal sender/receiver 17 and CLAD circuit 11 to each other, and transmits the directory number of telephone equipment 25 of node 20 to PB signal sender/receiver 17. PB signal sender/receiver 17 then sends a PB signal which is indicative of the directory number of telephone equipment 25 to CLAD circuit 11 through TDM switch 13. CLAD circuit 11 sets VPI-1 and VCI-1 indicated from CPU 14 respectively in the VPI and VCI fields and also sets the PB signal indicated from PB signal sender/receiver 17 in an information field, thus assembling a cell signal, and then transmits the cell signal to ATM network 40. After having transmitted the PB signal, CPU 14 controls TDM switch 13 to connect subscriber line circuit 16 and CLAD circuit 11 to each other.

Since the VPI field and VCI field of the cell signal transmitted from node 10 represents VPI-1 and VCI-1, ATM network 40 transfers the cell to node 20.

Each time an effective cell in which the VPI field represents VPI-1 and the VCI field represents VCI-1 arrives through ATM network 40, CLAD circuit 21 of node 20 restarts timer circuit 28 to monitor the arrival of a next cell. When the arrival of an effective cell begins at a fixed interval of time, CLAD circuit 21 transmits information representing the detection of an incoming call to CPU 24.

Upon recognition of the incoming call that has arrived at CLAD 21, CPU 24 controls TDM switch 23 to connect CLAD circuit 21 and PB signal sender/receiver 27 to each other. CLAD circuit 21 disassembles the cell signal into a TDM signal, and transfers PB signal through TDM switch 23 to PB signal sender/receiver 27. CPU 24 analyzes the number information transmitted thereto. If CPU 24 recognizes that the incoming call that has arrived at CLAD 21 requests connection to telephone device 25, then CPU 24 calls telephone device 25. When CPU 24 detects a off-hook response from the user of telephone device 25, CPU 24 controls TDM switch 23 to connect CLAD circuit 21 and subscriber line circuit 26.

CLAD circuit 11 of node 10 sets an audio signal transmitted from telephone device 15 through TDM switch 13 in the information field of the cell, and establishes VPI-1 and VCI-1 respectively in the VPI and VCI fields of the cell header, thereby assembling a cell signal. Then, CLAD circuit 11 transmits the cell signal to the ATM network 40. Since the VPI and VCI fields of the cell signal transmitted from the ATM network 40 represent VPI-1 and VCI-1, respectively, ATM network 40 transfers the cell to node 20. CLAD circuit 21 of node 20 disassembles the cell signal transferred from ATM network 40 into an audio signal, and transfers the audio signal to telephone device 25.

When the user of telephone device 15 goes back on-hook for a release, CPU 14 recognizes telephone device 15 restored to its idle state. CPU 14 instructs CLAD circuit 11 to stop assembling the cell in which the VPI and VCI fields represent VPI-1 and VCI-1, respectively, and controls TDM switch 13 to disconnect subscriber line circuit 16 and the CLAD circuit 11 from each other. According to the instruction from CPU 14, CLAD circuit 11 stops assembling the cell in which the VPI and VCI fields represent VPI-1 and VCI-1, respectively.

At this time, no cell arrives from node 10 at CLAD circuit 21 of node 20. Therefore, timer circuit 28 enters a time-out condition, and CLAD circuit 21 detects the stoppage of the arrival of the cell in which the VPI and VCI fields represent VPI-1 and VCI-1, respectively. CLAD circuit 21 indicates the release from the call to CPU 24. When CPU 24 recognizes the release from the call that has been handled by CLAD circuit 21, the CPU 24 controls TDM switch 23 to disconnect CLAD circuit 21 and subscriber line circuit 26 from each other, and the process is finished.

An audio signal from telephone device 25 of the node 20 to telephone device 15 of the node 10 can be transmitted in a process which is exactly the reversal of the process described above.

When a call is sent from telephone device 15 to telephone device 31 of node 30, the call is processed in the same manner as described above. However, since the call is transferred from node 10 to node 30, VPI-2 and VCI-2 which represent a cell transfer from the node 10 to the node 30 are set in the VPI and VCI fields of a cell which is assembled by CLAD circuit 11. Consequently, the same CLAD circuit can be used to process calls directed to different routes by assigning different identifiers, i.e., VPI and VCI, to cells.

In the above embodiment, in the ATM network which provides a PVC service, each of the nodes has a memory for storing virtual identifiers determined depending on destinations, and each time a call is made to a destination node, the CPU of each node reads virtual identifiers of the destination node from the memory, and indicates the virtual identifiers to the CLAD circuit. However, when the ATM network does not provide a PVC (permanent virtual circuit) service, then a node which originates a call is required to determine virtual identifiers according to a different procedure that has been established between the electronic exchange equipment and the ATM network. Except for the above process for determining the virtual identifiers, the call can be transmitted and received in the same manner.

Although certain preferred embodiments of the present invention have been shown and described in detail, it should be understood that various changes and modifications may be made therein without departing from the scope of the appended claims.

What is claimed is:

1. An ATM electronic exchange network system comprising:

a plurality of electronic exchange equipment, each having an ATM cell assembly/disassembly means for assembling and disassembling ATM cells each having a virtual path identifier and a virtual channel identifier; and an ATM network interconnecting said plurality of electronic exchange equipment, said ATM network being adapted to provide a permanent virtual circuit service in which a destination node is specified in advance by a virtual path identifier and a virtual channel identifier; wherein said electronic exchange equipment providing the functions of recognizing a destination node based on a called number transmitted from terminal equipment connected to said electronic exchange equipment, and indicating to said cell assembly/disassembly means a virtual oath identifier and a virtual channel identifier corresponding to said destination node which are determined according to a procedure established between said electronic exchange equipment and said ATM network, and said cell assembly/disassembly means providing the functions of assembling a TDM signal arriving from said terminal equipment into a cell signal based on said virtual path identifier and virtual channel identifier, sending said cell signal to said ATM network, disassembling said cell signal arriving from said ATM network into a TDM signal, and sending said TDM signal to said terminal equipment.

2. An ATM electronic exchange network system according to claim 1, wherein said cell assembly/disassembly means provides the further functions of determining that an incoming call is originated based upon reception of a cell containing user information in an information field thereof, counting time intervals of incoming cells for which each of the virtual path identifier and virtual channel identifier has its respective value corresponding to said destination node, and determining that the incoming call is released when no cell having an identical virtual path identifier and virtual channel identifier has been received for a predetermined time period.

3. An electronic exchange equipment for use in an ATM electronic exchange network system interconnecting a plurality of electronic exchange equipment by way of an ATM network in which a destination node is specified by a virtual path identifier and a virtual channel identifier, said electronic exchange equipment comprising:

a time-division switch;

cell assembly/disassembly means for assembling and disassembling ATM cells each having a virtual path identifier and a virtual channel identifier; and controller means for providing the functions of recognizing a destination node based on a called number transmitted from terminal equipment connected to said electronic exchange equipment, indicating to said cell assembly/disassembly means a virtual path identifier and a virtual channel identifier corresponding to said destination node which are determined according to a procedure established between said electronic exchange equipment and said ATM network, and controlling operation of said electronic exchange equipment;

said cell assembly/disassembly means providing the functions of assembling a TDM signal arriving from said time-division switch into a cell signal based on said virtual path identifier and virtual channel identifier which are indicated from said controller means, sending said cell signal to said ATM network, disassembling said cell signal arriving from said ATM network into a TDM signal, and sending said TDM signal to said time-division switch.

4. An electronic exchange equipment according to claim 3, wherein said virtual path identifier and virtual channel identifier corresponding to said destination node are read from a table which is previously stored in a memory in said electronic exchange equipment and indicated to said cell assembly/disassembly means by said controller means.

5. An electronic exchange equipment according to claim 3, wherein said cell assembly/disassembly means provides the further functions of determining that an incoming call is originated based upon reception of a cell containing user information in an information field thereof, sending information indicating originating call detection to said controller means, counting time intervals of incoming cells for which the virtual path identifier and virtual channel identifier have an identical value corresponding to said destination node, determining that the incoming call is released when no cell having an identical virtual path identifier and virtual channel identifier has been received for a predetermined time period, and sending information indicating release call detection to said controller means.

6. An electronic exchange equipment according to claim 3, wherein said electronic exchange equipment is an electronic private automatic branch exchange, and said terminal equipment is a telephone device.

7. An electronic exchange equipment according to claim 4, wherein said electronic exchange equipment is an electronic private automatic branch exchange, and said terminal equipment is a telephone device.

8. An electronic exchange equipment according to claim 5, wherein said electronic exchange equipment is an electronic private automatic branch exchange, and said terminal equipment is a telephone device.

* * * * *